June 18, 1929. A. MELDRUM 1,718,169
VEHICLE WHEEL
Original Filed Sept. 13, 1926
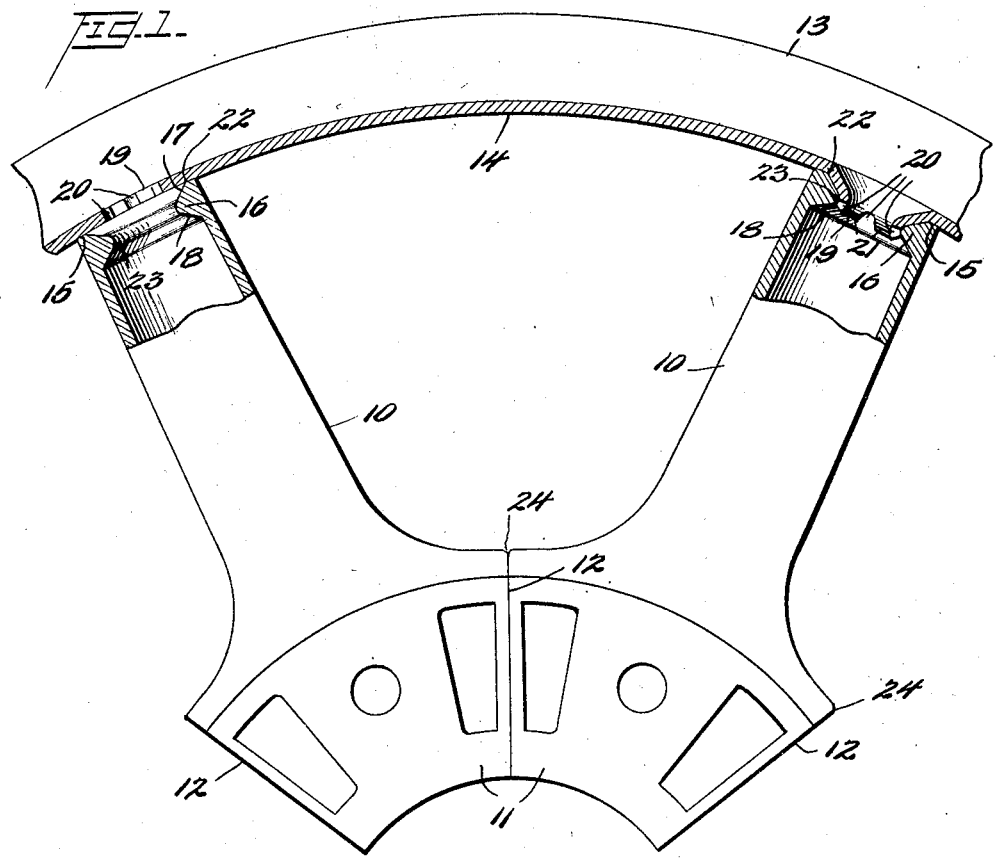
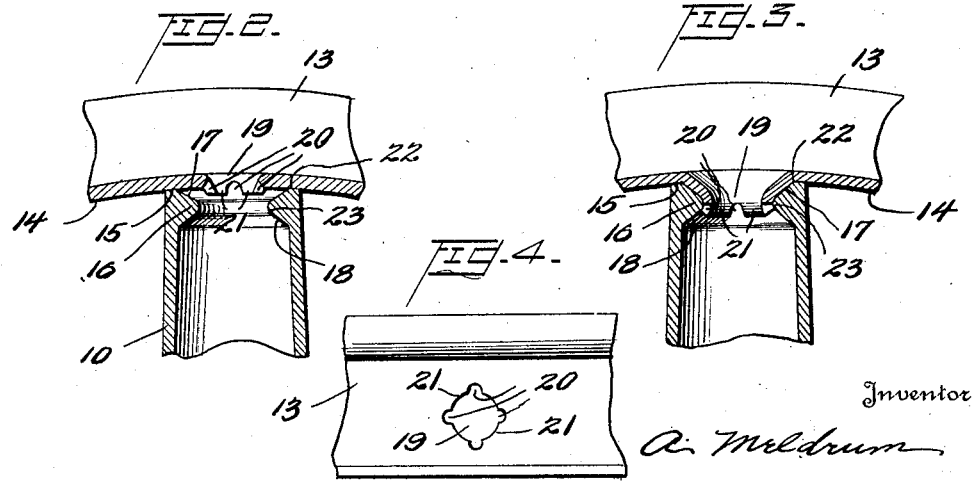
Inventor
A. Meldrum
By Watson, Coit, Morse & Grindle
Attorney Patented June 18, 1929.

1,718,169

UNITED STATES PATENT OFFICE.

ALEXANDER MELDRUM, OF SYRACUSE, NEW YORK, ASSIGNOR TO MELDRUM-GABRIELSON CORPORATION, OF SYRACUSE, NEW YORK, A CORPORATION OF NEW YORK.

VEHICLE WHEEL.

Original application filed September 13, 1926, Serial No. 135,156. Divided and this application filed January 3, 1927, Serial No. 158,728. Renewed December 7, 1928.

This invention relates to vehicle wheels and more particularly to spoked, metal, vehicle wheels.

It is a general object of the present invention to provide a novel and improved form of metal vehicle wheel.

More particularly, it is an object of this invention to provide, in a spoked, metal, vehicle wheel, means for securing the outer ends of the spokes to the felloe whereby all of the spokes may first be assembled into a spider, which as a unit may then be inserted into the felloe, the ends of the spokes then being attached to the felloe without the use of any additional fastening means.

Another object of the invention consists in the provision of novel means for securing the end of a hollow metal spoke to a metal felloe comprising forming the felloe into the hollow end of the spoke and interlocking the same with an inwardly extending flange secured to the spoke.

A further object of the invention consists in the provision of a novel method of assembling a spoke and felloe comprising forming a hole in the felloe having tongues projecting therein, abutting a spoke end against the felloe surrounding said hole, bending the tongues inwardly and finally forming a portion of the felloe, surrounding the hole, into the end of the spoke whereby the tongues are caused to hook beneath an inwardly projecting, peripheral flange in the spoke.

Other and further objects of the invention will be more apparent to those skilled in the art after a consideration of the following specification and accompanying drawing wherein is disclosed a single embodiment of the invention, it being understood, however, that such changes may be made therein as fall within the scope of the appended claims, without departing from the spirit of the invention.

In said drawing:

Fig. 1 is a side elevation partially in section on a median plane of a pair of spokes and a portion of a felloe, one of the spokes being shown as attached to the felloe and the other as unattached;

Fig. 2 is a section through a spoke end and a portion of the felloe showing the first step in attaching the two;

Fig. 3 is a view similar to Fig. 2 showing the completed spoke end after the attaching operation; and Fig. 4 is a plan view of a portion of the felloe before attaching to a spoke.

In manufacturing all metal, vehicle wheels of the spoked type, some means must be provided for attaching the spoke ends to the felloe. If the usual manner of attaching a wood spoke to a felloe is made use of, i. e. a tenon on the spoke fitting into a mortise in the felloe, then it will readily be apparent that the spokes must be individually inserted into the felloe and their inner ends, which together form a hub structure must be first arranged out of the plane of the finished wheel and finally all compressed into this plane, finishing the driving of the tenons into the felloe. Such a construction does not result in the strongest form of wheel nor does it offer the ease of assembly nor cheapness of construction resulting from the present novel method of and means for securing the spokes in a wheel.

Referring to the drawings, there is disclosed at 10 a plurality of spokes cast preferably from malleable metal to a configuration such that the outer or main portions of the spokes are tubular and of any desired cross section, and the inner ends are sector-like as shown at 11. The spokes are preferably hollow throughout and may be reinforced by ribs as shown. The sectors of all of the spokes when assembled form what may be considered a ring-like hub portion, since each is provided with a pair of radial faces 12 adapted to abut corresponding faces on the two adjacent spokes.

The spokes are adapted to be assembled into an all metal felloe 13 preferably formed as a rolled, seamless ring having a cylindrical inner surface 14 against which the ring-like end surfaces 15 of the spokes are adapted to abut. Each spoke has its end finished off to an arcuate surface of a radius equivalent to the radius of the inner face of the portion 14 of the felloe in order that a close fit may result. Just within the end of each spoke is a peripheral flange 16 having outer and inner conical surfaces 17 and 18, as clearly shown in Fig. 1. The conical surface 17 may conveniently merge into the end surface 15 of the spoke. The felloe is provided with an aperture or hole 19 for each spoke, so positioned that when the spokes are properly arranged within the felloe the hole is central of the hollow portion of the end of the spoke. The holes are preferably circular but are provided additionally with the notches 20 forming between themselves the portions 21 which may be termed tongues or projections. In order to secure a spoke to the felloe the two parts are positioned as shown in the left hand spoke in Fig. 1. When in this position the projections or tongues 21 are bent inwardly to the angle shown in Fig. 2 by inserting a plug of the proper taper and shape into the hole 19 and driving the same in. When this plug is removed the felloe appears as in Fig. 2 with the tongues 21 projecting partially into the hollow of the spoke. The material of the felloe surrounding the opening 19 is then forced into the hollow conical end of the spoke by any suitable operation such as spinning, swaging or the like. The metal bends about the junction of the conical surface 17 and the surface 15, i. e. at the ring line 22, and in moving inwardly to the position disclosed in Fig. 3 it causes the tongues 21 to be forced beneath the edge 23 of the flange and to hook against the under surface 18 as clearly disclosed in Fig. 3, forming a lock between the spoke and the felloe which cannot readily be dislodged even if an attempt is made to move the spoke in the direction of its axis. Any lateral displacement of the spoke end is rigidly resisted by the tongues.

The type of joint above described is extremely simple and the assembling operation involved consumes but little time. By constructing the spoke ends as disclosed, the molding of the spokes is simplified for they can be molded on end and parted on a plane joining the edges 24. The parting fin being in the position described, is automatically removed when the flat faces 26 on either side of the spoke are machined off to receive the hub discs. A further condition advantageous to the manufacture of the spokes of the above described form lies in the fact that metal of equal thickness is assured in all parts of the spoke resulting from the vertical molding position, as there is no tendency for the core to move sideways. Core prints can readily be provided at the upper end of the spoke and in the openings 27. These latter prints prevent the core from rising during the pouring operation.

In assembling a wheel as above described, it is preferred to assemble first all of the spokes into the form of a spider and to then shrink or otherwise contract the felloe over their ends in order to insure a tight fit and the elimination of rattles, squeaks and the like. Such a means of assembly can only be resorted to where there are no projections beyond the seating faces 15 at the end of the spoke.

The shrinking operation may have a tendency to move one spoke inwardly more than another even in spite of the fact that their radial faces 12 are carefully machined to the proper angle. To prevent the possibility of this and to assist in the ready assembly and maintaining of the spider during the shrinking process, means may be provided to prevent such relative movement of the spokes. It is preferred to use the means disclosed in the applicant's copending application Serial No. 135,156 filed September 13, 1926, of which this application is a division.

Having thus described the invention, what is claimed as new and desired to be secured by Letters Patent is:

1. In a vehicle wheel, in combination, a metal felloe, a hollow metal spoke having an open outer end, an inwardly projecting peripheral flange at said spoke end and a portion of said felloe passing into said open end and being hooked beneath said flange for the purpose described.

2. In a vehicle wheel, in combination, a metal felloe having a hole therein, a hollow metal spoke having its outer end abutting said felloe surrounding said hole, a projection on said spoke end extending radially inwardly, a portion of said felloe surrounding said hole extending into said spoke end and interlocking with said projection.

3. In a vehicle wheel, in combination, a metal felloe having a hole therein, a hollow metal spoke having its outer end abutting said felloe surrounding said hole, an inwardly extending peripheral flange on said spoke near its end, a portion of said felloe passing into said spoke end, through said flange and being expanded beneath said flange for the purpose described.

4. In a vehicle wheel, in combination, a metal felloe having a hole therein, tongues projecting into said hole, a hollow metal spoke having its outer end abutting said felloe surrounding said hole, a peripheral flange around the inside of said spoke end presenting a conical outer surface, said felloe surrounding said hole entering said spoke end and resting on said conical surface and said tongues being turned under said flange.

5. The method of securing a hollow metal spoke to a metal felloe comprising forming a hole in said felloe having tongues projecting therein, forming an inner flange near the spoke end, abutting the spoke against said felloe surrounding the hole, bending said tongues into said spoke end, and forming the metal around said tongues into said spoke end whereby said tongues are caused to hook under said flange.

In testimony whereof I hereunto affix my signature.

ALEXANDER MELDRUM.